Figure 1:
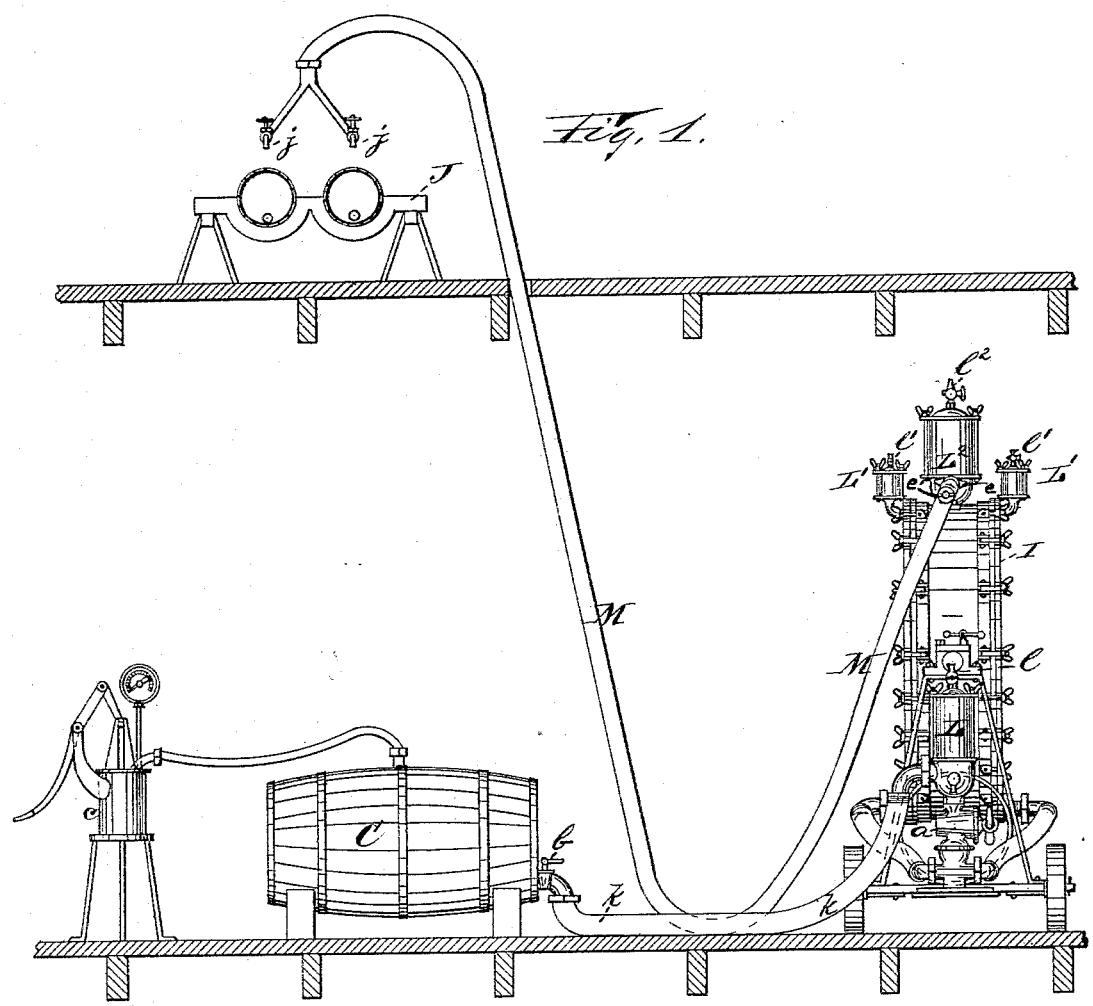

(No Model.) 2 Sheets—Sheet 1.
H. STOCKHEIM.
FILTERING PROCESS FOR BEER.

No. 378,379. Patented Feb. 21, 1888.

Witnesses
Ewell a. Dick
Marvin A. Curtis.

Inventor,
Heinrich Stockheim.
By his Attorneys Edmund Wetmore &
W. A. Jenner.

(No Model.) 2 Sheets—Sheet 2.

H. STOCKHEIM.
FILTERING PROCESS FOR BEER.

No. 378,379. Patented Feb. 21, 1888.

Witnesses

Inventor
Heinrich Stockheim.
By his Attorneys

UNITED STATES PATENT OFFICE.

HEINRICH STOCKHEIM, OF MANNHEIM, BADEN, GERMANY, ASSIGNOR TO SIMON UHLMANN AND FREDERICK UHLMANN, BOTH OF NEW YORK, N. Y.

FILTERING PROCESS FOR BEER.

SPECIFICATION forming part of Letters Patent No. 378,379, dated February 21, 1888.

Application filed November 28, 1887. Serial No. 256,342. (No model.)

*To all whom it may concern:*

Be it known that I, HEINRICH STOCKHEIM, a citizen of the German Empire, and a resident of Mannheim, in the Grand Duchy of Baden, Germany, have invented a certain new and useful Filtering Process for Beer, of which the following is a specification.

The object of this invention is the filtration of beer which contains mechanical impurities, and also carbonic-acid gas under pressure. In the filtration of such liquids it is important that the liquid—beer, for example—should be filtered continuously in its passage from the store-cask to the keg into which it is drawn for sale without material loss of the gas contained in the beer and without material foaming in the keg into which the filtered beer is delivered.

The methods in use prior to my invention for clearing beer of the yeast which is produced in it as a product of fermentation have generally involved the use of isinglass, by which the yeasty particles are collected and precipitated to the bottom of the tun or cask containing the beer. Isinglass is, however, costly and involves a very large annual expenditure where any considerable amount of beer is brewed and much trouble in preparing it for use as a "fining," and it is slow in its operation; nor are the results entirely satisfactory, as all of the yeasty particles are not thereby removed, but some portion remains, and yeast being a fungous growth, that which remains propagates more yeast, fermentation continues, and in consequence the beer is apt to become cloudy and spoiled. This result is especially noticeable in beer which is bottled and intended to be kept for some time, either for export or domestic use.

In mechanical filtration variations in the supply of beer to the filter and in the speed with which the filtered beer is discharged into the keg permit the carbonic-acid gas generated in the beer to escape in considerable quantities while the beer is passing through the filter, and the beer, having lost its carbonic-acid gas, or a considerable quantity of it, comes out flat and insipid, or is discharged into the keg in a foamy condition and soon becomes worthless, besides which the escape of the gas in the filter causes foaming therein, the foam collects upon and clogs the pores of the filtering substance, or the gas permeates the filtering substance, thereby affecting its efficiency as a separator of mechanical impurities, or both results ensue, and thus the operation of the filter is materially retarded, the variations of supply and discharge are increased, and in consequence the filtering substance fails to collect much of the yeast. To modify these results would require the frequent changing of the filtering substance, and this would involve not only expense for filtering material, but considerable loss of beer and delays in the filtering operation. Continuous filtration without material variation in the speed with which the beer is discharged from the cask is also important, because if the speed of the discharge is materially diminished the accumulated air-pressure will burst the cask unless it is closely watched; and the cask being usually in a cellar, where neither continuous sunlight nor gaslight is permitted, because either would elevate the temperature of the cellar, such watching is inconvenient. For these reasons, among others, mechanical filtration has not, I believe, been generally or successfully practiced by beer-brewers before my invention.

By my improved method of filtering I dispense entirely with the use of isinglass or other finings, and thus very great economy is secured, the beer is thoroughly clarified, all or substantially all of the yeasty particles being removed, the operation of filtering is rapid and continuous without material variation in speed and without the necessity of changing or cleansing the filtering substances, the carbonic-acid gas is substantially preserved in the beer, and the beer comes out of the filter retaining all its brilliancy and liveliness, ready to be discharged into the keg at the racking-off bench without any danger of subsequent cloudiness or other deterioration due to the filtration, and without having had imparted to it any undesirable taste.

The drawings illustrate the arrangement of mechanism in and by which my improved filtering method is carried out.

Figure 2:
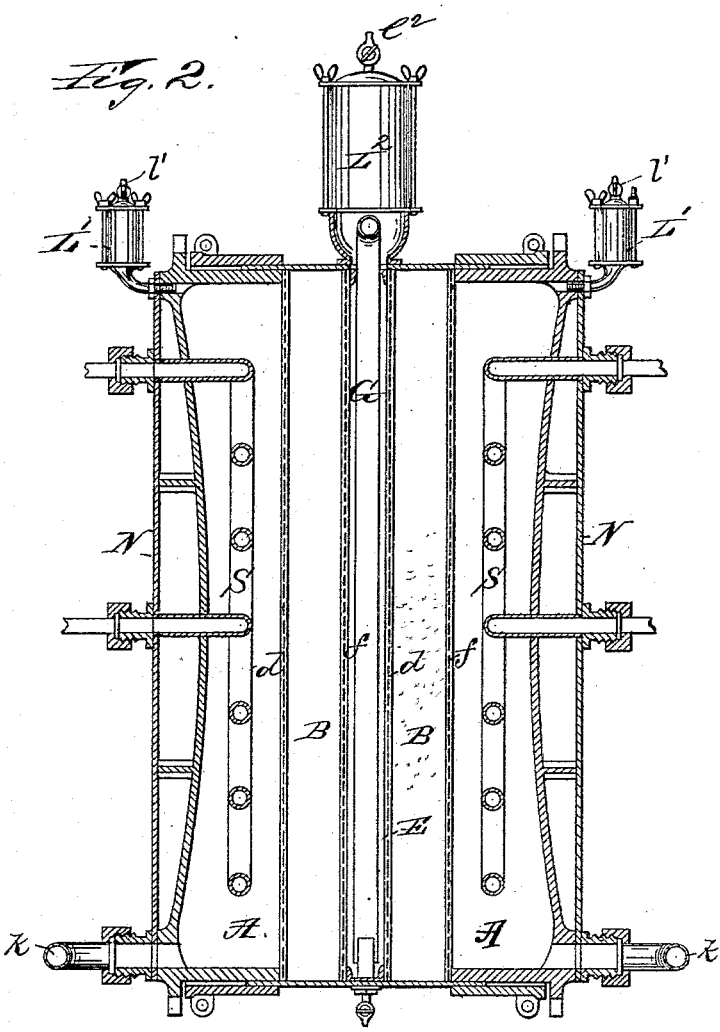

Figure 1 shows the situation of the tun or store-cask, the filtering apparatus, and the racking-off bench relatively to each other. Fig. 2 shows the filtering apparatus in sectional view.

C, Fig. 1, is the store-cask, containing the beer to be clarified, being shown in the drawings relatively very much smaller than the store-casks generally in use, which contain from fifty to two hundred barrels of beer.

c is an air-pump, of any suitable construction, by which air is pumped into the cask as the beer is withdrawn, and so that a pressure of thirteen to twenty pounds, or other desired pressure, may be maintained in the cask. The air-pressure in the cask serves not only to keep the carbonic-acid gas in the beer which is in the cask and to prevent foaming therein, but also to force the beer through the filter with sufficient rapidity to maintain a constant and full head at the racking-bench.

k is the supply pipe or hose which conducts the beer from the cask to the filter I, and preferably enters the filter at or near the bottom.

M is the pipe or hose which conducts the beer from the filter to the racking-bench J, where, under the control of the faucets j, it is let into the kegs.

In the filter I, Fig. 2, the entrance-chamber A for the beer is separated from the discharge-chamber E by the filtering material, B, which is contained between perforated plates $d f$. At the highest point of the entrance and discharge chambers, and preferably above the filter-line, are vent-cocks $l'$, $l'$, and $l^2$ for the escape of such gas as may separate from the beer in its passage from the cask to and through the filtering apparatus. When the vent-cock is combined directly with the chamber or pipe to which it appertains, the vent-cock must be operated frequently to prevent the possible accumulation of gas in the chamber or pipe to which it appertains. In order that this frequent operation of the vent-cock may be dispensed with, the vent-cock is combined with the chamber or pipe to which it appertains through the intervention of a vessel in which the gas may be caught and permitted to accumulate without affecting the operation of the filter, as $L'$, $L'$, and $L^2$, thereby obviating any difficulty that might accrue from the accumulation of gas in the filter itself. In order that such gas as may separate from the beer in its passage from the store-cask to the filtering apparatus may escape without entering the filtering apparatus, the supply-pipe k has a vent-cock, $l$, combined with it, either directly or through the intervention of the gas-trap L. In order that the accumulation of gas in the gas-trap may be detected, each gas-trap has either its body made of glass or has glass panels inserted in its side, or the gas-trap, if made of metal, has a glass water-gage of the usual construction connected with it. A gas-trap of either of these constructions I denominate a "lantern" gas-trap. Through the coils S a cooling liquid may be circulated for the purpose of keeping the beer cool, or the same thing may be accomplished by means of an exterior jacket containing ice or a cooling liquid. The discharge-pipe G passes, preferably, from the lower part of the discharge-chamber E up and out of the filtering apparatus, and at or near e, or at any other convenient point, by a coupling of any construction which will make, as nearly as possible, an air and liquid tight joint, is attached the hose M, having a valve, $e'$; or, if desired, the hose M, provided with the valve $e'$, may be connected with an orifice in the bottom of the discharge-chamber, and the beer be discharged thereby without passing through the internal pipe, G. When the hose M is so connected, the discharge-opening of the pipe G should be closed by a cap.

The filtering media which I prefer to use consists of several layers, as follows: first, a layer of long-fibered wood pulp of from one to two inches thickness; second, a layer of paper and long-fibered wood pulp, also from one to two inches in thickness; third, a sheet of cloth or flannel, preferably a cloth which has a web of cotton and a filling of wool. The wood pulp and paper-pulps should be deprived of their resinous or other properties which would impart a disagreeable taste to the beer passing through them by being treated in the manner described in my application for a filtering compound about to be filed. These different filtering substances should be so arranged in the filter as that the unfiltered beer passes first through the wood pulp, which restrains the coarser impurities, next through the mixed paper and wood pulp, which restrains finer impurities, and lastly through the cloth, which acts not only to restrain the finer impurities that may have passed the other layers, but also to catch and hold any shreds of the latter that may have been dislodged by the beer passing through them, and these different substances should preferably be separated from each other by perforated tinned metal plates; but my filtering process may be employed when only two, or even one, of the above-named substances, or paper, or any other substance suitable for beer-filtration are used. I also prefer that the filtering apparatus shall be circular or pyramidal in form, and that the filtering media shall be in a vertical plane, or nearly so, because the greatest amount of surface is thus presented by the filtering substance to the incoming beer and the least amount of air space or room for the gathering of foam and escape of carbonic-acid gas is afforded.

In starting the operation the air-pump is connected with the store-cask, and is so regulated as to maintain the desired pressure in the cask as the beer is discharged. The hose k is connected with the cask and filter on the entrance side, and the hose M with the filter and faucets at the racking-bench on the discharge side, by couplings made air and liquid tight as nearly as possible, and one of the faucets $j$ is then opened. Everything being in readiness, the tap-cock $b$ is opened, the air-pump is started, and, the cock $a$ being open, the beer passes through the hose $k$ into the entrance-chamber of the filtering apparatus, forcing the air which was in the entry-chamber, the gas which has separated from the beer, and the foam thereby formed into the gas-traps L and L', none of it passing through the filtering media. The vent-cocks $l$ and $l'$ are now opened, and the air, gas, and foam in the gas-traps L and L', respectively, or in the entrance-chambers and collected in the said gas-traps are drawn off. The beer meanwhile, having passed through the filtering media, forces the air which was in the discharge-chamber and the gas escaping from the beer and the foam forming therein into the top of the gas-trap $L^2$. The vent-cock $l^2$ is now opened and the air and gas in the gas-trap $L^2$ and the foam formed therein or in the discharge-chamber and collected in said gas-trap $L^2$ are drawn off. The vent-cocks $l'$ and $l^2$ are kept open until all the air, gas, and foam in the gas-traps to which they respectively appertain are drawn off and the gas-traps L' are seen to be filled with unfiltered beer, and the vent-cock $l^2$ is kept open until the gas-trap $L^2$ is seen to be filled with beer. They are then closed, and the filter is now filled with beer, the entrance-chambers with unfiltered beer, and the discharge-chamber with filtered beer. The cock $e$ is now opened and the air-pressure at the cask continues to force the beer into the entrance-chambers through the filtering media into the discharge-chamber and out through the pipe G and its extension M to the racking-bench, where it is drawn into the kegs in the usual manner.

In case any air enters the filter, either through the connecting-pipes or otherwise, or if any gas escapes from the beer from changes or variations of pressure either on the entrance or discharge side, or by reason of partial clogging of the filtering media or from other cause, the air or gas, as the case may be, at once ascends to the top of one or other of the gas-traps, where, being easily observed, it is, together with the foam thereby caused, allowed to escape through the vent-cock, the filtration meanwhile proceeding without any interruption or disturbance.

In the drawings, Fig. 1, the racking-bench is shown as situated on the floor, or on a level above that of the store-cask, and this is the arrangement, I believe, in most breweries. The result is that the column of beer in the pipe G and hose M constitutes a back-pressure by which the filter and the gas-traps at the top thereof may be kept completely filled with beer; but in some breweries the racking-bench is situated on the same floor or level as the cask. In such case a back-pressure sufficient to keep the gas-traps filled with beer should be formed by elevating the hose M at a point between the filter and the racking-off bench, a little above the top of the lantern, or by narrowing the capacity of the hose M relatively to the capacity of the hose $k$ and the air-pressure at the cask.

As there is always more or less circulation of beer in the lantern, and the lantern being of glass, the beer therein may be conveniently observed, and the quality of the beer passing through the filter—that is, its freedom from impurities—may be known. Of course, if the gas-trap is not of lantern construction, a sample of the filtered beer may be from time to time drawn off for observation by means of the vent-cock, and the vent-cock may from time to time be opened to allow the escape of any air, gas, or foam which may have accumulated in the gas-trap; but this is less convenient than to make the trap of lantern construction. The interior of the chambers of the filter may also be so formed as to constitute traps for air, gas, or foam, the vent-cocks being placed at their highest points; but such arrangement is still less desirable.

Having thus described my process and the apparatus in and by which it is conducted, what I claim as new is—

1. The process of filtering beer, consisting in drawing the beer to be filtered from the cask under a pressure exceeding atmospheric pressure, conducting the same to and through a filtering apparatus in which that pressure is maintained during the filtering operation, keeping the filtering apparatus full of beer, collecting and carrying off any air entering the filter along with the beer and gas separating from the beer during the filtering operation, and discharging the filtered beer from the filter under pressure, substantially as hereinbefore set forth.

2. The described process of filtering and keeping beer, which consists in forcing the beer under a pressure exceeding atmospheric pressure from the store-cask through a filtering apparatus and thence to the keg, keeping said apparatus full of beer during the operation, and collecting and carrying off from the beer during its passage from the store-cask to the keg air that may be mingled with the beer and gas that may separate from the beer, substantially as and for the purposes hereinbefore set forth.

3. The process of filtering beer, consisting in drawing the beer from the cask under a pressure exceeding ordinary atmospheric pressure, forcing the beer under said pressure through a filter, maintaining that pressure in the filter during the filtering operation, and creating and maintaining a back-pressure in the filter, so as to keep the filter full of beer, substantially as described.

4. The process of filtering beer, consisting in drawing the beer from the cask under a pressure exceeding ordinary atmospheric pressure, forcing the beer under said pressure through a filter, maintaining that pressure in the filter during the filtering operation, creating and maintaining a back-pressure in the filter, so as to keep the filter full of beer, and collecting and carrying off from the beer any
5 gas separating from the beer on its way from the store-cask to or through the filtering apparatus, substantially as described.

Signed at New York, in the county of New York and State of New York, this 7th day of October, A. D. 1887.

HEINRICH STOCKHEIM.

Witnesses:
W. H. CRITTENDEN,
F. HAMMATT NORTON.